(12) United States Patent
Lim et al.

(10) Patent No.: US 8,238,687 B1
(45) Date of Patent: Aug. 7, 2012

(54) LOCAL CONTRAST ENHANCEMENT OF IMAGES

(75) Inventors: Suk Hwan Lim, Menlo Park, CA (US); Pavel Kisilev, Maalot (IL)

(73) Assignee: Helwett-Packard Development Company, L.P., Houston, TX (US)

( * ) Notice: Subject to any disclaimer, the term of this patent is extended or adjusted under 35 U.S.C. 154(b) by 988 days.

(21) Appl. No.: 12/236,261

(22) Filed: Sep. 23, 2008

Related U.S. Application Data (60) Provisional application No. 61/020,142, filed on Jan. 9, 2008.

(51) Int. Cl.
 *G06K 9/40* (2006.01)

(52) U.S. Cl. ....... 382/274; 382/260; 382/275; 358/3.26; 358/3.27

(58) Field of Classification Search .................. 382/260, 382/274, 275; 358/3.26, 3.27, 463
See application file for complete search history.

(56) References Cited

U.S. PATENT DOCUMENTS

| | | |
|---|---|---|
| 5,708,693 A | 1/1998 | Aach et al. |
| 6,633,654 B2 | 10/2003 | Hannigan et al. |
| 6,741,753 B1 | 5/2004 | Moroney |
| 6,813,041 B1 | 11/2004 | Moroney et al. |
| 7,082,218 B2 * | 7/2006 | Pollard et al. ............... 382/167 |
| 7,167,598 B2 | 1/2007 | Vuylsteke |
| 7,265,784 B1 * | 9/2007 | Frank ............................ 348/241 |
| 7,483,058 B1 * | 1/2009 | Frank et al. ............... 348/222.1 |
| 7,595,825 B2 * | 9/2009 | Tsuruoka ...................... 348/241 |
| 7,831,105 B2 * | 11/2010 | Engel et al. .................... 382/254 |
| 7,860,167 B2 * | 12/2010 | Le Dinh et al. ............ 375/240.2 |
| 7,983,511 B1 * | 7/2011 | Chan .............................. 382/275 |
| 7,991,280 B2 * | 8/2011 | Ogino ............................. 396/98 |
| 2006/0187232 A1 | 8/2006 | Kempf et al. |
| 2007/0009167 A1 | 1/2007 | Dance et al. |
| 2007/0036456 A1 | 2/2007 | Hooper |
| 2007/0223839 A1 | 9/2007 | Kisilev et al. |

OTHER PUBLICATIONS

Nathan Moroney, "Local Color Correction Using Non-Linear Masking," IS&T/SID Eighth Color Image Conf., pp. 108-111 (2000).

* cited by examiner

*Primary Examiner* — Yosef Kassa (57) ABSTRACT

A set of local noise variation values characterizing local noise levels in the input image is calculated. Local contrast enhancement is performed on image forming element values derived from the input image to produce a contrast enhanced image. Values of local noise amplification caused by the local contrast enhancement are ascertained. Noise in the contrast enhanced image is reduced based on the set of local noise variation values and the local noise amplification values.

20 Claims, 5 Drawing Sheets

LOCAL CONTRAST ENHANCEMENT OF IMAGES

CROSS-REFERENCE TO RELATED APPLICATIONS

This application relates to the following copending applications, each of which is incorporated herein by reference: U.S. application Ser. No. 11/064,128, filed Feb. 23, 2005; U.S. application Ser. No. 11/388,152, filed Mar. 22, 2006; and U.S. application Ser. No. 11/174,685, filed Jul. 5, 2005.

This Application claims the benefit of U.S. Provisional Application Ser. No. 61/020,142, filed Jan. 9, 2008, titled "Local Contrast Enhancement Of Images"

BACKGROUND

Contrast is the difference between the lightest and darkest regions of an image. Local contrast enhancement attempts to enhance the appearance of local details in an image by increasing contrast in local regions of the image. Common techniques for local contrast enhancement include adaptive histogram equalization and adaptive contrast enhancement. Many of these techniques segment an image either in the spatial or frequency domain and then perform a contrast enhancement operation on each image segment. These techniques typically attempt to stretch the contrast or compress dynamic range in the regions of highlights and shadows so as to provide greater percentage of available dynamic range to the mid-tones. Local contrast enhancement is useful for enhancing hazy or dull looking images, as well as reducing the effects of lens flare.

SUMMARY

In one aspect, the invention features a method of processing an input image. In accordance with this inventive method, a set of local noise variation values characterizing local noise levels in the input image is calculated. Local contrast enhancement is performed on image forming element values derived from the input image to produce a contrast enhanced image. Values of local noise amplification caused by the local contrast enhancement are ascertained. Noise in the contrast enhanced image is reduced based on the set of local noise variation values and the local noise amplification values.

The invention also features a system and a machine readable medium storing machine-readable instructions causing a machine to implement the method described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Overview

The embodiments that are described in detail below are capable of generating images having increased local contrast and reduced noise. In particular, these embodiments are operable to accurately determine the local noise in contrast-enhanced images and to use this information to reduce noise artifacts that otherwise might be introduced or amplified by the local contrast enhancement process. These embodiments overcome the problem of inaccurate noise estimation that results from application standard noise estimation techniques (which presume that local noise is a function of image intensity and free of any spatially varying noise content) to contrast enhanced images in which local noise contains spatially varying noise content as a result of the local contrast enhancement.

II. Definition of Terms

The term "image forming element" refers to an addressable region of an image. In some embodiments, the image forming elements correspond to pixels, which are the smallest addressable units of an image. Each image forming element has at least one respective value that is represented by one or more bits. For example, an image forming element in the RGB color space includes a respective value for each of the colors red, green, and blue, where each of the values may be represented by one or more bits.

The term "noise variation" means the degree to which noise values tend to spread about an average noise value. The term "noise variation" encompasses any type of measure of the variation (or dispersion) in noise values, including but not limited to variance, standard deviation, range, mean deviation, semi-interquartile range, and 10-90 percentile range.

The term "spatially corresponding image forming elements" refers to image forming elements of different images that are located in substantially the same spatial regions of the respective images. In some implementations, spatially corresponding image forming elements are image forming elements from the same image forming element locations (e.g., coordinates) within the different respective images (e.g., the image forming element locations in one image spatially correspond to the same image forming element locations in another image).

A "computer" is a machine that processes data according to machine-readable instructions (e.g., software) that are stored on a machine-readable medium either temporarily or permanently. A set of such instructions that performs a particular task is referred to as a program or software program.

The term "machine-readable medium" refers to any medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

III. Introduction

Figure 1:
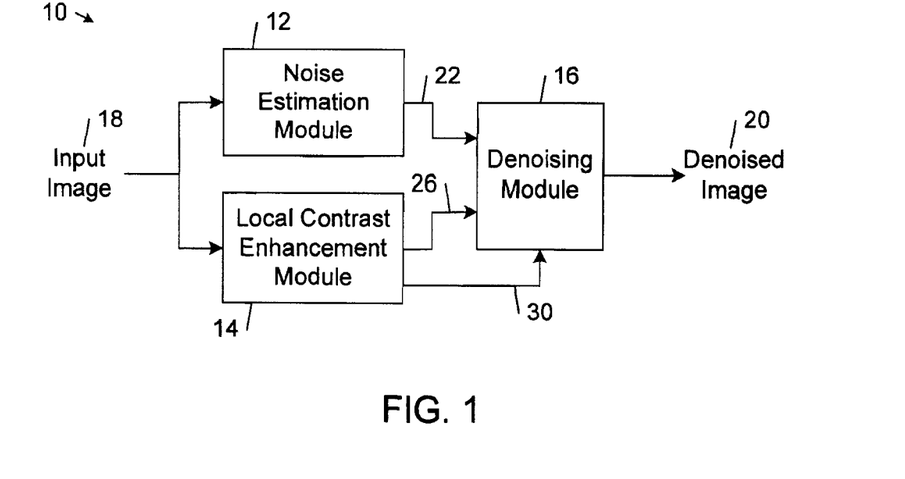
FIG. 1 is a block diagram of an embodiment of an image processing system.

FIG. 1 shows an embodiment of an image processing system 10 that includes a noise estimation module 12, a local contrast enhancement module 14, and a denoising module 16. In operation, the image processing system 10 processes an input image signal 18 to produce a denoised image 20.

In some embodiments, the input image 18 is in the form of a raw or minimally processed readout signal that is produced by an image sensor (e.g., a CCD image sensor or a CMOS image sensor). In other embodiments, the input image 18 corresponds to image forming element data obtained from an image file stored on a machine-readable medium.

Figure 2:
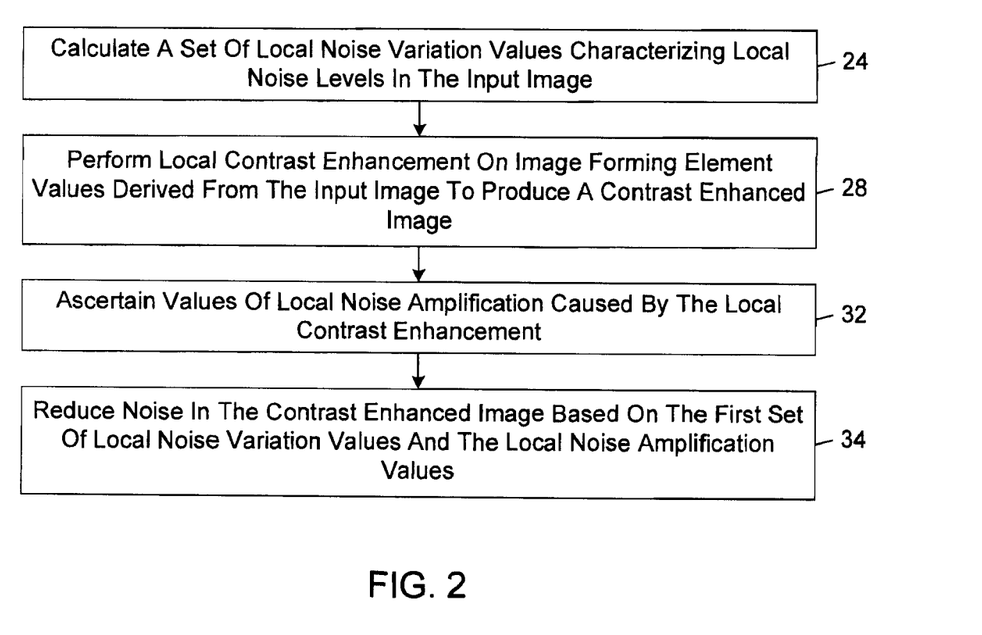
FIG. 2 is a flow diagram of an embodiment of a method of processing an image.

FIG. 2 shows an embodiment of a method that is implemented by the image processing system 10.

In accordance with the method of FIG. 2, the noise estimation module 12 calculates a set of local noise variation values 22 characterizing local noise levels in the input image 18 (FIG. 2, block 24). In general, the local noise variation values may correspond to any type of measure of the variation (or dispersion) in noise values. In some exemplary embodiments, the local noise variation values correspond to values of variance of local noise in the input image 18. In other exemplary embodiments, the local noise variation values correspond to values of standard deviation of local noise in the input image 18. The noise estimation module 12 passes the noise variation values 22 to the denoising module 16, as shown in FIG. 1.

The local contrast enhancement module 14 performs local contrast enhancement on image forming element values derived from the input image 18 to produce a contrast enhanced image 26 (FIG. 2, block 28). In some embodiments, the image forming element values that are subjected to local contrast enhancement correspond to the values of the image forming elements of the input image 18. In other embodiments, the image forming element values that are subjected to local contrast enhancement correspond to the values of the image forming elements of an intermediate image that is derived from the input image 18.

The local contrast enhancement module 14 also ascertains values 30 of local noise amplification caused by the local contrast enhancement (FIG. 2, block 32). The local noise amplification values correspond to estimates of the amount by which the local contrast enhancement modifies the local noise variations in the input image 18.

The local contrast enhancement module 14 passes the contrast enhanced image and the local noise amplification values to the denoising module 16, as shown in FIG. 1.

The denoising module 16 reduces noise in the contrast enhanced image 26 based on the set of local noise variation values and the local noise amplification values (FIG. 2, block 34). In some embodiments, the denoising module 16 produces the denoised image 20 by selectively applying a spatial filter (e.g., a low-pass filter) that spatially denoises local areas of the contrast enhanced image 30. The denoising module 16 typically either stores denoised image 20 on a machine-readable medium or passes the denoised image 20 to one or more downstream image processing modules.

In some embodiments, the calculating (FIG. 2, block 24), to the performing (FIG. 2, block 28), the ascertaining (FIG. 2, block 32), and the reducing (FIG. 2, block 34) are performed for each of the image forming elements of the input image 18.

IV. Exemplary Embodiments of the Image Processing System and its Components

A. Overview

The image processing system 10 typically is implemented by one or more discrete data processing modules (or components) that are not limited to any particular hardware, firmware, or software configuration. For example, in some implementations, the image processing system 10 is embedded in the hardware of any one of a wide variety of electronic apparatus, including desktop and workstation computers, image and video recording and playback devices (e.g., digital still and video cameras, VCRs, and DVRs), cable or satellite set-top boxes capable of decoding and playing paid video programming, portable radio and satellite broadcast receivers, portable telecommunications devices, and printers. The noise estimation module 12, the local contrast enhancement module 14, and the denoising module 16 are data processing components that may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of these data processing components 12-16 are combined into a single data processing component. In some embodiments, the respective functionalities of each of one or more of these data processing components 12-16 are performed by a respective set of multiple data processing components.

In some implementations, process instructions (e.g., machine-readable code, such as computer software) for implementing the methods that are executed by the image processing system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

B. An Exemplary Embodiment of the Noise Estimation Module

As explained above, the noise estimation module 12 calculates the local noise variation values 22, which may correspond to any measure that describes the noise variation in the input image 18. In some embodiments, the local noise variation values 22 describe the noise variance at the image forming elements (e.g., pixels) of the input image 18. In other embodiments, the local noise variation values 22 describe the noise standard deviation at the image forming elements (e.g., pixels) of the input image 18.

In some embodiments, the noise estimation module 12 estimates the local noise variation values 22 directly from the input image 18 using any of a wide variety of different image processing techniques. In some embodiments, the local noise variation values 22 are computed directly from the input image 12 in accordance with one or more of the signal noise estimation methods described in U.S. application Ser. No. 11/388,152, which was filed Mar. 22, 2006.

Figure 3:
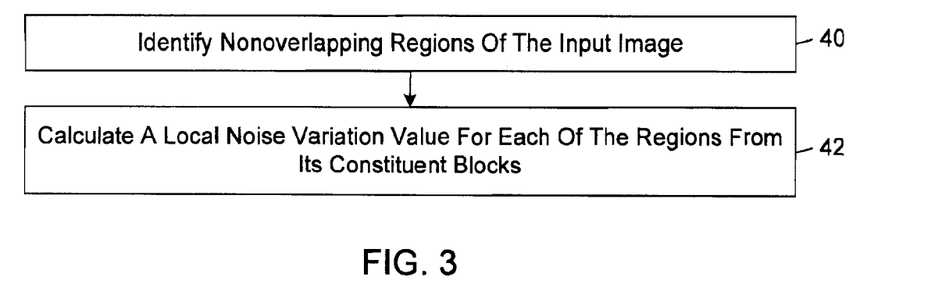
FIG. 3 is a flow diagram of an embodiment of a method of estimating noise in an image.

FIG. 3 shows an exemplary embodiment of a method of calculating the local noise variation values 22 directly from the input image 18. In accordance with the method of FIG. 3, non-overlapping regions of the input image 18 are identified (FIG. 3, block 40). The regions typically are not limited to any particular shape or size. In some embodiments, the regions are identified by dividing the input image 18 into N×N blocks, where K=N². The mean light intensity of each block is computed. The non-overlapping regions are identified based on an analysis of the mean light intensity values. In particular, each of the regions is assembled from all the blocks having mean intensity values within a different respective non-overlapping range. For example, in one exemplary embodiment, a first region consists of blocks having mean intensity values between 0 and 50, a second region consists of blocks having mean intensity values between 51 and 100, a third region consists of blocks having mean intensity values between 101 and 150, a fourth region consists of blocks having mean intensity values between 151 and 200, and a fifth region consists of blocks having mean intensity values between 201 and 255.

After the regions have been identified (FIG. 3, block 40), a local noise variation value is computed for each region from constituent blocks of the region (FIG. 3, block 42). For example, in some embodiments, the local noise variation value corresponds to local noise variance ($s^2$), which typically is computed for each block in accordance with equation (1);

$$s_m^2 = \frac{1}{K-1} \sum_{k=1}^{K} (y_{km} - \bar{y}_m)^2 \qquad (1)$$

where y is an image forming element value vector and $\bar{y}$ is a sample mean, and m denotes the $m^{th}$ block of the respective region. Noise variance ($s_{(1)}^2$) may be computed as the lowest variance among the blocks. That is, $s_{(1)}^2 = s_{min}^2$. The statistics (zero or negligible bias) are affected by the size and number of blocks. The accuracy of the local noise variance value for each region depends on the number of blocks in the respective region.

Additional details regarding the method of FIG. 3 may be obtained from U.S. application Ser. No. 11/174,685, filed Jul. 5, 2005, and from U.S. application Ser. No. 11/388,152, which was filed Mar. 22, 2006.

In other embodiments, the noise estimation module 12 calculates the local noise variation values 22 based on indirect estimates of noise variation in the input image 18. In this process, the noise estimation module 12 estimates the local noise variation values 22 for the image forming elements of the input image 18 from a noise variation profile that plots noise variation value estimates for the image forming elements of the input image 18 as a function of image forming element value. The noise variation profile may be determined in a wide variety of different ways. In some embodiments, the noise variation profile is determined from known parameters (e.g., shot noise, readout noise, and non-uniformity parameters) of the image sensor that was used to capture the input image 18. Before deriving the local noise variation values from the noise variation profile, the noise estimation module 12 typically normalizes the image forming element values of the input image 18 based on its exposure time.

C. An Exemplary Embodiment of the Local Contrast Enhancement Module

The local contrast enhancement module 14 may perform local contrast enhancement on the image forming elements derived from the input image 18 in a variety of different ways. In some embodiments, the local contrast enhancement module 14 performs local contrast enhancement using one or more adaptive histogram equalization processes, adaptive contrast enhancement processes, and local color correction processes.

Figure 4:
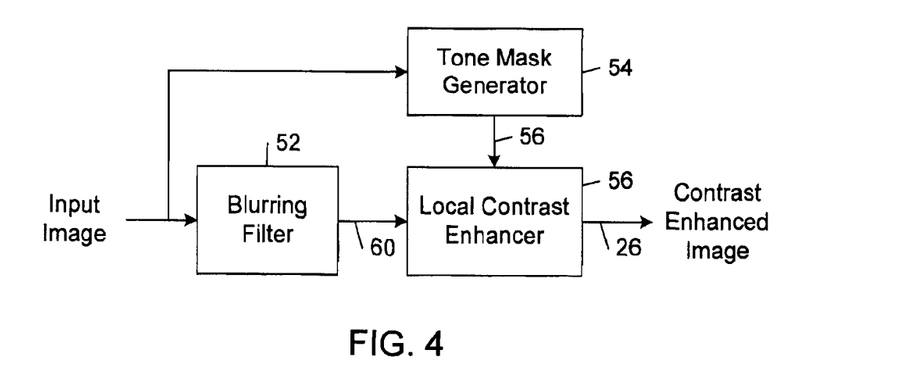
FIG. 4 is a block diagram of an embodiment of a local contrast enhancement module.
Figure 5:
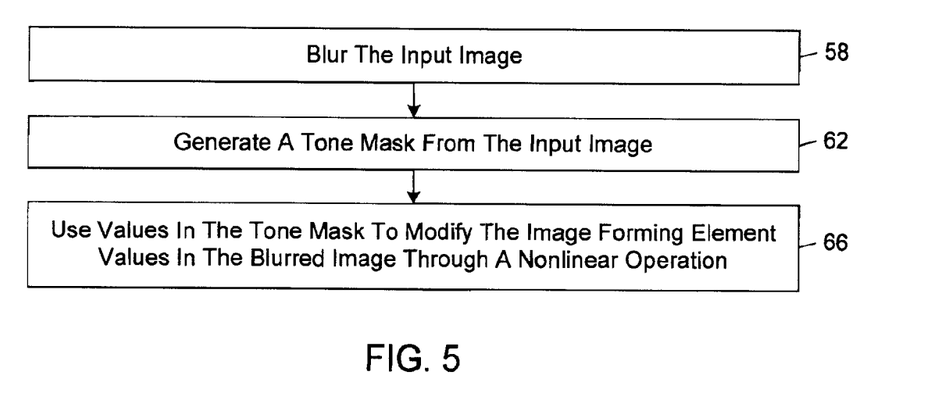
FIG. 5 is a flow diagram of an embodiment of a method of producing a contrast-enhanced image.

FIG. 4 shows an embodiment 50 of the local contrast enhancement module 14 that includes a blurring filter 52, a tone mask generator 54, and a local contrast enhancer 56. FIG. 5 shows an exemplary embodiment of a method by which the local contrast enhancement module 14 performs local contrast enhancement on the image forming element values that are derived from the input image 18.

In accordance with the method of FIG. 5, the blurring filter 52 blurs the input image 18 (FIG. 5, block 58). In general, the blurring filter may correspond to any type of burring or smoothing filter. In some embodiments, the blurring filter 52 processes intensity values ($I_{IN}$) derived from the input image 18 in accordance with a set of coefficients that define a low-pass filter (l) to produce a blurred image 60 ($I_B$). That is, $$I_B = l \otimes I_{IN} \qquad (2)$$

In general, the low-pass spatial filter coefficients may define any type of low-pass spatial filter. In some embodiments, the coefficients define a low-pass filter kernel. The blurred image 60 is generated by convolving the input image 18 with the low-pass filter kernel. In some exemplary embodiments of this type, the low-pass filter kernel is an K×K kernel of a Gaussian low-pass filter, where K has an odd integer value of 3 or greater. In some exemplary embodiments, K has a value of 5 or 7. In other embodiments, the coefficients are recursion coefficients and the blurred image 60 is generated by multiplying (or weighting) the input image 18 with the recursion coefficients. The blurring filter 52 passes the blurred image 60 to the local contrast enhancer 56, as shown in FIG. 4.

The tone mask generator 54 generates a tone mask from the input image 18 (FIG. 5, block 62). In some embodiments, the tone mask generator 54 converts the input image 18 into a monochrome image. The tone mask generator 54 inverts the monochrome image to produce an inverted image that indicates which regions of the blurred image 60 will be lightened or darkened. For example, a dark region in the blurred image 60 will have a light mask value and will therefore be lightened, whereas a light region in the blurred image will have a dark mask value and therefore will be darkened. The tone mask generator 54 typically blurs the inverted image such that image features are no longer recognizable in the resulting tone mask 64. This reduces excessive reduction in the local contrast enhancement produced by the local contrast enhancer 56. The tone mask generator 54 passes the tone mask 64 to the local contrast enhancer 56, as shown in FIG. 4.

The local contrast enhancer 56 uses the values in the tone mask 64 to modify the image forming element values in the blurred image through a nonlinear operation (FIG. 5, block 66). In some embodiments, the local contrast enhancer 56 produces the contrast enhanced image 26 using a power function in which the exponent is a function of the mask value. In one exemplary embodiment, the image forming element intensity values ($I_C$) derived from the contrast enhanced image 26 are computed from the spatially corresponding image forming element intensity values ($I_B$) of the blurred image 60 in accordance with contrast enhancement curves defined by equation (3):

$$I_C = 255 \cdot \left(\frac{I_B}{255}\right)^{\gamma} \qquad (3)$$

where $$\gamma = 2^{\left(\frac{128 - Mask}{128}\right)}.$$

In this embodiment, mask values (Mask) greater than 128 will result in an exponent less than 1 (i.e., γ<1) and therefore will lighten the corresponding image forming element value of the blurred image 60; mask values less than 128 will result in an exponent greater than 1 (i.e., γ>1) and therefore will darken the corresponding image forming element value of the blurred image 60; and mask values of 128 will result in an exponent value of 1 and therefore will not change the corresponding image forming element value of the blurred image 60. In some embodiments, the values of the contrast enhancement curves are stored in one or more lookup tables on a machine-readable medium.

Figure 6:
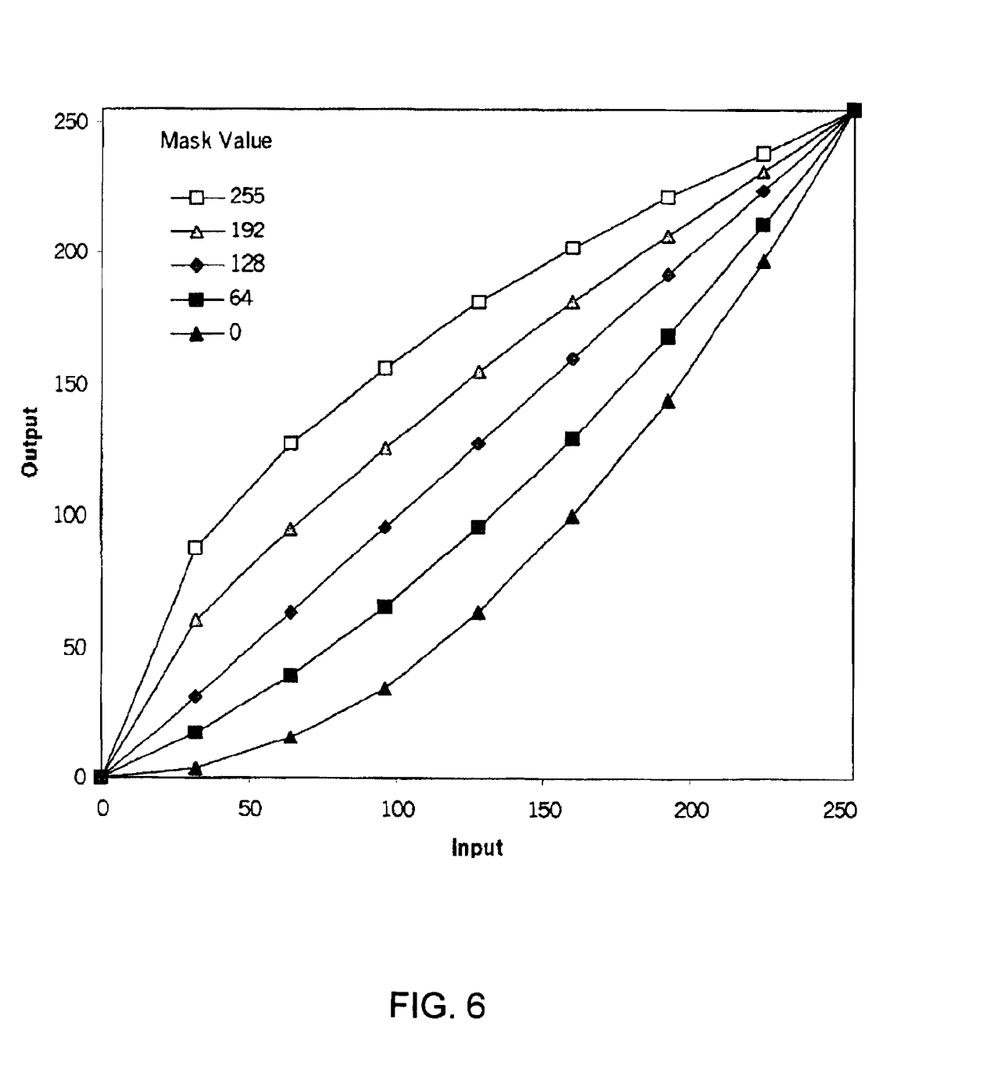
FIG. 6 is a graph containing exemplary contrast enhancement curves mapping image forming element values of an image input into a local contrast enhancer to image forming element values output from the local contrast enhancer for different tone mask values.

FIG. 6 shows a graph containing exemplary contrast enhancement curves mapping image forming element values of an image input into a local contrast enhancer to image forming element values output from the local contrast enhancer for different tone mask values.

Additional details regarding the method of FIG. 5 and the contrast enhancement curves shown in FIG. 6 may be obtained from U.S. Pat. No. 6,813,041.

In addition to performing local contrast enhancement, the local contrast enhancement module 14 ascertains values of local noise amplification (or gain) that occurs as a result of the local contrast enhancement. In general, the local contrast enhancement module 14 may determine the local noise amplification values in a variety of different ways. In some embodiments, the local contrast enhancement module 14 determines each of the local noise amplification values based on a respective measure of the rate of change in the contrast enhancement as a function of image forming element values at a respective one of the image forming elements.

In some of these embodiments, the local noise amplification values are determined from the rate of change in the contrast enhancement as a function of image intensity at a respective local input image intensity (luminance) value. In this regard, the intensity values ($I_C$) of the contrast enhanced image 26 are modeled by equation (4):

$$I_C = f(I_B) \quad (4)$$

where $I_B$ represents the intensity values of the blurred image 60 (see FIG. 4) and f(•) represents the contrast enhancement curve mapping the intensity values of the blurred image 60 to intensity values of the contrast enhanced image 26 (see, e.g., FIG. 6). The intensity values ($I_C$) of the contrast enhanced image 26 can be approximated by equation (5) for $I_B$ near $I_0$:

$$I_C \approx \left( \frac{\partial f(I_B)}{\partial I_B} \bigg|_{I_B=I_0} \right) \cdot (I_B - I_0) + f(I_B) \quad (4)$$

Under this model, the local noise amplification (A) for intensities near $I_0$ is given by the slope term in equation (4). That is, $$A = \left( \frac{\partial f(I_B)}{\partial I_B} \bigg|_{I_B=I_0} \right) \quad (5)$$

Thus, in these embodiments, the local noise amplification values 30 are approximated for a given image forming element by the slope of the contrast enhancement curve used to modify the intensity values of the image forming element at (or in the vicinity of) that intensity value.

D. An Exemplary Embodiment of the Denoising Module

The denoising module 16 reduces noise in the contrast enhanced image 26 based on the set of local noise variation values 22 received from the noise estimation module 12 and the local noise amplification values 30 received from the local contrast enhancement module 14.

In some embodiments, the denoising module 16 determines a second set of local noise variation values characterizing local noise levels in the contrast enhanced image 26. The second set of local noise variation values is determined based on the first set of local noise variation values and the local noise amplification values. In some embodiments, the denoising module 16 determines each of the local noise variation values in the second set by evaluating a function of a corresponding one of the local noise variation values in the first set and a corresponding one of the local noise amplification values. This process typically involves multiplying the corresponding local noise variation value in the first set and the corresponding local noise amplification value. In one exemplary embodiment, the local noise variation values ($v_{NOISE,\,C}$) that are determined for the contrast enhanced image 26 are calculated from the local noise variation values ($v_{NOISE,\,IN}$) that are determined for the input image in accordance with equation (6):

$$v_{NOISE,C} = A \cdot v_{NOISE,IN} \quad (6)$$

where A is given by equation (5).

The denoising module 16 applies a denoising filter to the contrast enhanced image 26 based on the local noise variation values in the second set. For this purpose any type of denoiser may be used, including a Gaussian smoothing filter, wavelet-based denoiser and a bilateral smoothing filter. The denoising module 16 selectively applies the denoising filter to local areas of the contrast enhanced image in which respective differences between values of local intensity variation in the local areas and the corresponding local noise variation values in the second set satisfy a maximum threshold predicate. The denoising module 16 does not apply the denoising filter in local areas of the contrast enhanced image in which respective differences between values of local intensity variation in the local areas and the corresponding local noise variation values in the second set fail to satisfy the maximum threshold predicate. For example, in some embodiments, the denoising module 16 applies the denoising filter to regions of the contrast enhanced image 26 in which the difference between the value of local intensity variation in the local area and the corresponding local noise variation values is equal to or less than an empirically determined threshold, and does not apply the denoising filter to regions of the contrast enhanced image 26 in which the difference between the value of local intensity variation in the local area and the corresponding local noise variation values is above the empirically determined threshold.

V. Exemplary Architectures of the Image Processing System and Associated Application Environments

Figure 7:
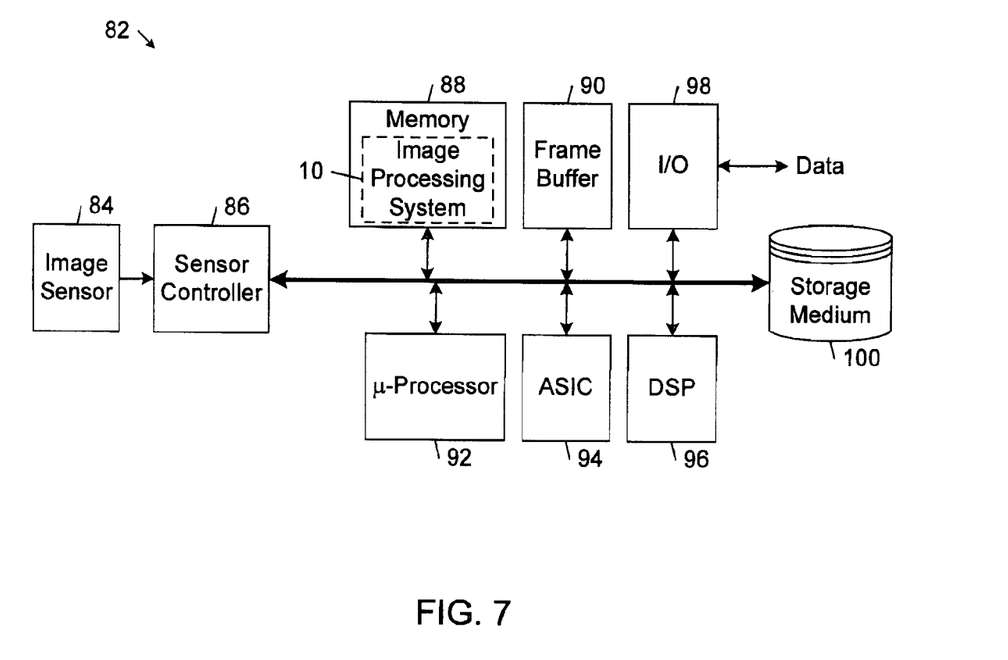
FIG. 7 is a block diagram of an embodiment of a digital camera system that incorporates an embodiment of the image processing system shown in FIG. 1.

A. A First Exemplary Image Processing System Architecture and Application Environment FIG. 7 shows an embodiment of a digital camera system 82 that incorporates an embodiment of the image processing system 10. The digital camera system 82 may be configured to capture one or both of still images and video image frames. The digital camera system 82 includes an image sensor 84 (e.g., a charge coupled device (CCD) or a complementary metal-oxide-semiconductor (CMOS) image sensor), a sensor controller 86, a memory 88, a frame buffer 90, a microprocessor 92, an ASIC (application-specific integrated circuit) 94, a DSP (digital signal processor) 96, an I/O (input/output)

adapter 98, and a storage medium 100. The values that are output from the image sensor 84 may be, for example, 8-bit numbers or 12-bit numbers, which have values in a range from 0 (no light) to 255 or 4095 (maximum brightness). In general, the image processing system 10 may be implemented by one or more of hardware and firmware components. In the illustrated embodiment, the image processing system 10 is implemented in firmware, which is loaded into memory 88. The storage medium 100 may be implemented by any type of image storage technology, including a compact flash memory card and a digital video tape cassette. The image data stored in the storage medium 100 may be transferred to a storage device (e.g., a hard disk drive, a floppy disk drive, a CD-ROM drive, or a non-volatile data storage device) of an external processing system (e.g., a computer or workstation) via the I/O subsystem 98.

The microprocessor 92 choreographs the operation of the digital camera system 82, including processing the input image captured by the image sensor 84 in accordance with the image processing methods that are described herein. The microprocessor 92 typically is programmed to perform various operations on the resulting denoised image 20, including one or more of the following operations: demosaicing; color correction; image compression; one or more storage operations; and one or more transmission operations.

In some of these embodiments, the input image 18 and the denoised image 20 are in the color filter array domain where the image forming element data are arranged in accordance with the spatial arrangement of color filters in the color filter array. For example, in some implementations, the image sensor 84 captures raw Bayer pattern images each of which includes an array of pixels corresponding to colors in a repeating spatial 2×2 pattern in which the upper left pixel is a red pixel, the upper right pixel is a green pixel, the lower left pixel is a green pixel, and the lower right pixel is a blue pixel. In these embodiments, the denoised image 20 typically is fed into one or more downstream image processing blocks, including a demosaicing block, that process the denoised image signal 20 into a compressed or uncompressed denoised image. The demosaicing block separates different color images from the denoised image 20.

Figure 8:
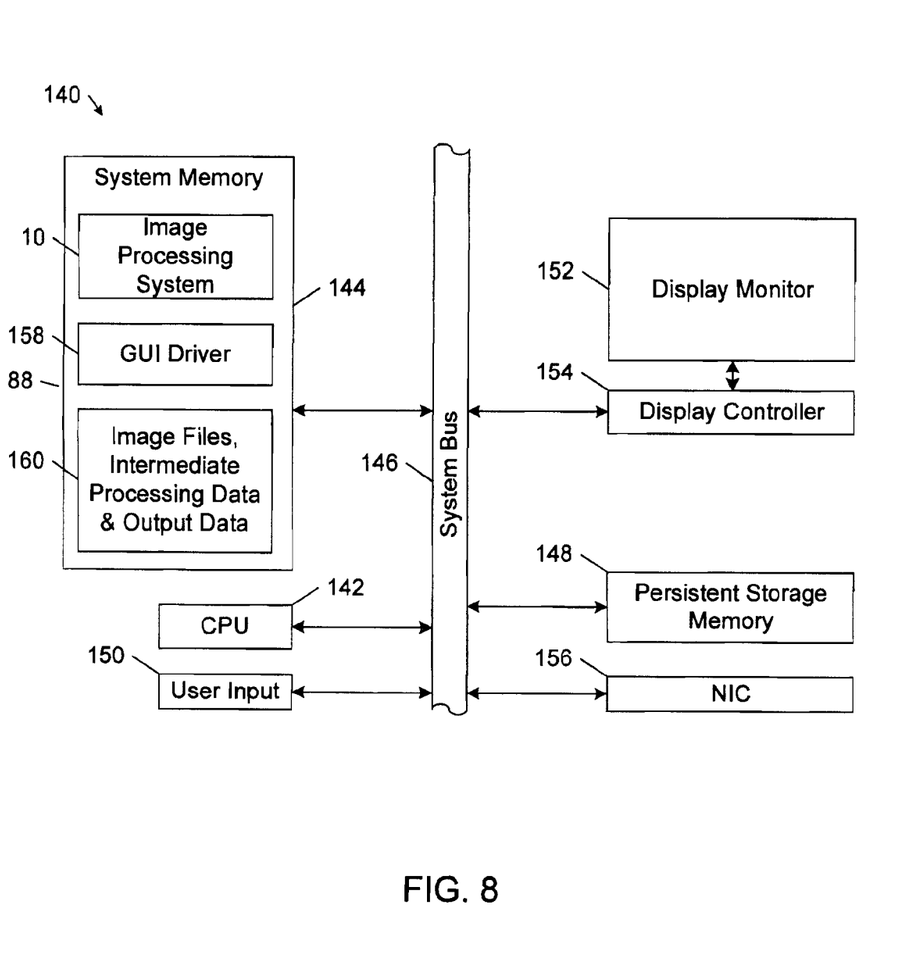
FIG. 8 is a block diagram of an embodiment of a computer system that is programmable to implement an embodiment of the image processing system shown in FIG. 1.

B. A Second Exemplary Image Processing System Architecture and Application Environment FIG. 8 shows an embodiment of a computer system 140 that incorporates an embodiment of the image processing system 110. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a graphical user interface (GUI) that is displayed to the user on a display monitor 152, which is controlled by a display controller 154. The computer system 140 also typically includes peripheral output devices, such as speakers and a printer. One or more remote computers may be connected to the computer system 140 through a network interface card (NIC) 156.

As shown in FIG. 12, the system memory 144 also stores an embodiment of the image processing system 10, a GUI driver 158, and a database 160 containing image files corresponding to the input image 18 and the denoised image 20, intermediate processing data, and output data. In some embodiments, the image processing system 110 interfaces with the GUI driver 158 and the user input 150 to control the creation of the compound image signal 22. In some embodiments, the computer system 140 additionally includes a graphics application program that is configured to render image data on the display monitor 152 and to perform various image processing operations on one or both of the input image 18 and the denoised image 20.

VI. Conclusion

The embodiments that are described in detail below are capable of generating images having increased local contrast and reduced noise. In particular, these embodiments are operable to accurately determine the local noise in contrast-enhanced images and to use this information to reduce noise artifacts that otherwise might be introduced by the local contrast enhancement process. These embodiments overcome the problem of inaccurate noise estimation that results from application standard noise estimation techniques (which presume that local noise is a function of image intensity and free of any spatially varying noise content) to contrast enhanced images in which local noise contains spatially varying noise content as a result of the local contrast enhancement.

Other embodiments are within the scope of the claims.

What is claimed is:

1. A machine-implemented method of processing an input image, comprising:
    calculating a set of local noise variation values characterizing local noise levels in the input image;
    performing local contrast enhancement on image forming element values derived from the input image to produce a contrast enhanced image;
    ascertaining values of local noise amplification caused by the local contrast enhancement; and
    reducing noise in the contrast enhanced image based on the set of local noise variation values and the local noise amplification values.

2. The method of claim 1, wherein the local noise variation values correspond to values of variance of local noise in the input image.

3. The method of claim 1, wherein the local noise variation values correspond to values of standard deviation of local noise in the input image.

4. The method of claim 1, wherein the ascertaining comprises determining each of the local noise amplification values based on a respective measure of rate of change in the contrast enhancement as a function of image intensity at a respective local input image intensity value.

5. The method of claim 1, wherein the input image comprises image forming elements, each of the image forming elements has at least one respective value, and the ascertaining comprises determining each of the local noise amplification values based on a respective measure of rate of change of the contrast enhancement as a function of image forming element values at a respective one of the image forming elements.

6. The method of claim 1, wherein the reducing comprises determining a second set of local noise variation values characterizing local noise levels in the contrast enhanced image based on the first set of local noise variation values and the local noise amplification values, and the reducing is based on the second set of local noise variation values.

7. The method of claim 6, wherein the determining comprises for each of the local noise variation values in the second set evaluating a function of a corresponding one of the local noise variation values in the first set and a corresponding one of the local noise amplification values.

8. The method of claim 7, wherein the evaluating comprises for each of the local noise variation values in the second set multiplying the corresponding local noise variation value in the first set and the corresponding local noise amplification value.

9. The method of claim 6, wherein the reducing comprises applying a denoising filter to the contrast enhanced image based on the local noise variation values in the second set.

10. The method of claim 9, wherein the applying comprises selectively applying the denoising filter to local areas of the contrast enhanced image in which respective differences between values of local intensity variation in the local areas and the corresponding local noise variation values in the second set satisfy a maximum threshold predicate, and omitting the application of the denoising filter in local areas of the contrast enhanced image in which respective differences between values of local intensity variation in the local areas and the corresponding local noise variation values in the second set fail to satisfy the maximum threshold predicate.

11. The method of claim 1, further comprising blurring the input image to produce a blurred image, and wherein the performing comprises performing the local contrast enhancement on the blurred image.

12. The method of claim 1, wherein the input image comprises image forming elements, each of the image forming elements has at least one respective value, and the calculating, the performing, the ascertaining, and the reducing are performed for each of the image forming elements of the input image.

13. Apparatus for processing an input image, comprising:
a memory; and
a processing unit coupled to the memory and operable to perform operations comprising
calculating a set of local noise variation values characterizing local noise levels in the input image;
performing local contrast enhancement on image forming element values derived from the input image to produce a contrast enhanced image;
ascertaining values of local noise amplification caused by the local contrast enhancement; and
reducing noise in the contrast enhanced image based on the set of local noise variation values and the local noise amplification values.

14. The apparatus of claim 13, wherein the processing unit is operable to perform operations comprising determining each of the local noise amplification values based on a respective measure of rate of change in the contrast enhancement as a function of image intensity at a respective local input image intensity value.

15. The apparatus of claim 13, wherein the processing unit is operable to perform operations comprising determining a second set of local noise variation values characterizing local noise levels in the contrast enhanced image based on the first set of local noise variation values and the local noise amplification values, and the reducing is based on the second set of local noise variation values.

16. The apparatus of claim 15, wherein in the determining the processing unit is operable to perform operations comprising for each of the local noise variation values in the second set evaluating a function of a corresponding one of the local noise variation values in the first set and a corresponding one of the local noise amplification values.

17. The apparatus of claim 15, wherein the processing unit is operable to perform operations comprising applying a denoising filter to the contrast enhanced image based on the local noise variation values in the second set.

18. The apparatus of claim 17, wherein in the applying the processing unit is operable to perform operations comprising selectively applying the denoising filter to local areas of the contrast enhanced image in which respective differences between values of local intensity variation in the local areas and the corresponding local noise variation values in the second set satisfy a maximum threshold predicate, and omitting the application of the denoising filter in local areas of the contrast enhanced image in which respective differences between values of local intensity variation in the local areas and the corresponding local noise variation values in the second set fail to satisfy the maximum threshold predicate.

19. The apparatus of claim 13, wherein the processing unit is operable to perform operations comprising blurring the input image to produce a blurred image, and in the performing the processing unit is operable to perform operations comprising performing the local contrast enhancement on the blurred image.

20. A non-transitory machine readable medium for arranging graphic objects on a page, the machine readable medium storing machine-readable instructions causing a machine to perform operations comprising:
calculating a set of local noise variation values characterizing local noise levels in the input image;
performing local contrast enhancement on image forming element values derived from the input image to produce a contrast enhanced image;
ascertaining values of local noise amplification caused by the local contrast enhancement; and
reducing noise in the contrast enhanced image based on the set of local noise variation values and the local noise amplification values.

* * * * *

UNITED STATES PATENT AND TRADEMARK OFFICE
CERTIFICATE OF CORRECTION

| | | |
|---|---|---|
| PATENT NO. | : 8,238,687 B1 | Page 1 of 1 |
| APPLICATION NO. | : 12/236261 | |
| DATED | : August 7, 2012 | |
| INVENTOR(S) | : Suk Hwan Lim et al. | |

It is certified that error appears in the above-identified patent and that said Letters Patent is hereby corrected as shown below:

On the title page, item (73), Assignee, in column 1, line 1, delete "Helwett" and insert -- Hewlett --, therefor.

Signed and Sealed this
Twenty-second Day of January, 2013

David J. Kappos
*Director of the United States Patent and Trademark Office*